C. C. WESTON.
INCUBATOR.
No 189,820. Patented April 17, 1877.
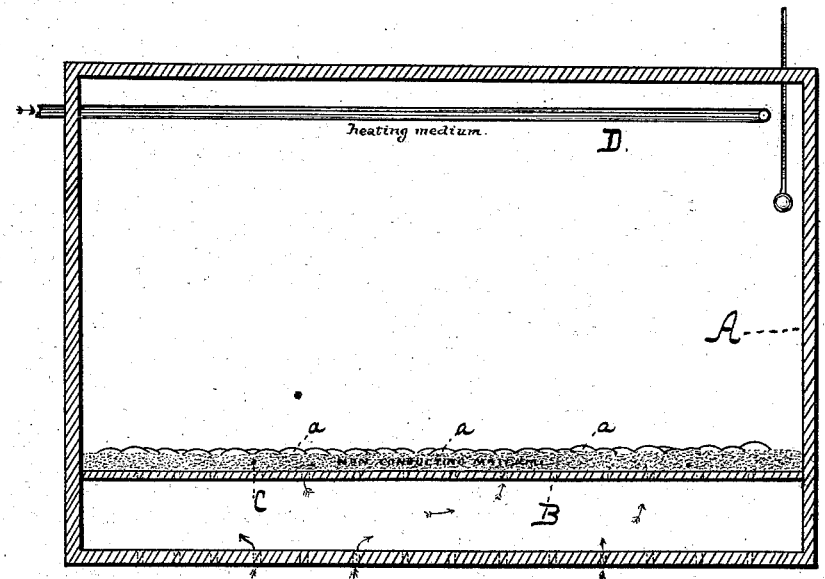
Attest.
W. A. Bertram.
Henry Pistet.
Inventor.
Chauncey C. Weston
per R. D. Williams
Attorney.

UNITED STATES PATENT OFFICE.

CHAUNCEY C. WESTON, OF LAUREL, MARYLAND.

IMPROVEMENT IN INCUBATORS.

Specification forming part of Letters Patent No. 189,820, dated April 17, 1877; application filed March 10, 1877.

*To all whom it may concern:*

Be it known that I, CHAUNCEY C. WESTON, of Laurel, in the county of Prince George's, State of Maryland, have invented certain new and useful Improvements in Incubators; and I hereby declare the same to be fully described as follows, reference being had to the accompanying drawings.

This invention relates to devices for hatching eggs by artificial heat; and it consists in the combination, with any suitable and well-known form of incubator, of a nest of non-conducting material, upon which the eggs are placed, and in which they are partially embedded.

It consists, further, in a process of incubation, and in certain details of the apparatus, as hereinafter claimed.

My design is to assimilate more nearly the artificial to the natural process of incubation.

A fowl in setting upon eggs imparts to them the natural heat of her body from above—a position obviously most unfavorable to a uniform heating of the contents of the egg—which can thus only become heated by conduction, convection being, under the circumstances, impossible. The inference is, since nature never errs, that a uniform heating of the egg is not necessary, nor even desirable, in the process of incubation. A provision of nature, in natural incubation, secures the maximum temperature to the vitellus of the egg, which, being specifically lighter than the albumen, floats to the upper surface of the egg, and approaches most nearly to the body of the setting fowl. The albumen obviously remains at a lower temperature than the vitellus in natural incubation, while in artificial incubation, as heretofore practiced, the entire contents of the egg remain at a sensibly uniform temperature.

In order to assimilate as nearly as possible to the natural process, I employ means for heating the egg solely by radiation and conduction from above; and to this end I strew the shelves of any ordinary incubator with any suitable non-conducting material, such as earth, sand, charcoal, asbestus, or mineral wool. In this material the eggs are partially embedded, and submitted to the action of artificial heat from any convenient source.

I do not consider it necessary to enter into a detailed description here of any form of incubator.

My present invention is applicable to any form now in use, and for a particular description of one the reader is referred to Letters Patent of the United States granted to me April 6, 1875.

In the accompanying drawings, A represents the hatching-chamber, having a rack or shelf, B, upon which is strewn the non-conducting material C, in which the eggs *a a* are partially embedded. A pipe, D, conveys the heating medium, which may be air, steam, or water. The shelf B and also the bottom of the chamber A are perforated, to permit free ingress of cool air, in order to keep the lower portions of the eggs from becoming heated to a temperature equal to that of the upper portions.

The results flowing from the use of the above-described apparatus are such as might naturally be anticipated. A far greater percentage of the eggs hatch in this than in other incubators, or by the natural process of incubation.

Having thus described my invention, what I claim as new, and desire to secure by Letters Patent, is—

1. An incubator having a bed consisting of a suitable non-conducting material, in which the eggs are partially embedded, substantially as described.

2. The process of artificial incubation herein described, the same consisting in submitting eggs to artificial heat, the lower portions of the eggs being protected from access of the heat, substantially as described.

CHAUNCEY C. WESTON.

Witnesses:
R. D. WILLIAMS,
A. W. HART.